United States Patent
McDaniel et al.

(10) Patent No.: US 12,411,874 B2
(45) Date of Patent: Sep. 9, 2025

(54) DISTRIBUTED ACTIVE LEARNING IN NATURAL LANGUAGE PROCESSING FOR DETERMINING RESOURCE METRICS

(71) Applicant: Capital One Services, LLC, McLean, VA (US)

(72) Inventors: Christopher McDaniel, Glen Allen, VA (US); Michael Anthony Young, Jr., Henrico, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 362 days.

(21) Appl. No.: 18/061,156

(22) Filed: Dec. 2, 2022

(65) Prior Publication Data
US 2024/0184812 A1    Jun. 6, 2024

(51) Int. Cl.
*G06F 16/00*     (2019.01)
*G06F 16/3329*   (2025.01)
*G06F 40/35*     (2020.01)

(52) U.S. Cl.
CPC .......... *G06F 16/3329* (2019.01); *G06F 40/35* (2020.01)

(58) Field of Classification Search
CPC .............................. G06F 16/3329; G06F 40/35
USPC ........................................................ 707/721
See application file for complete search history.

(56) References Cited

U.S. PATENT DOCUMENTS

| | | | |
|---|---|---|---|
| 2020/0285737 A1* | 9/2020 | Kraus | G06F 21/552 |
| 2021/0005188 A1* | 1/2021 | Benkreira | G10L 15/063 |
| 2022/0004954 A1* | 1/2022 | Rafferty | G06F 40/35 |
| 2023/0195056 A1* | 6/2023 | Sharma | G06Q 20/4016 |
| | | | 700/47 |

FOREIGN PATENT DOCUMENTS

WO   WO-2021012742 A1 *  1/2021   ......... G06K 9/00268

\* cited by examiner

*Primary Examiner* — Monica M Pyo
(74) *Attorney, Agent, or Firm* — Foley & Lardner LLP

(57) ABSTRACT

A method includes a system for improving machine-learning-based resource allocation by calibrating resource-related sentiments used to configure a dialogue generation model and updating a prior sentiment based on a response to a generated dialogue item, including a set of processors. Embodiments may also include a non-transitory, machine-readable media storing program instructions that, when executed by the set of processors, performs operations including retrieving a historical record associated with a user and a first natural language input provided by the user for a resource. Embodiments may also include determining, with a first machine learning model, an intermediate sentiment score based on the first natural language input. Embodiments may also include modifying, with the first machine learning model, the intermediate sentiment score based on the historical record to produce a new sentiment score.

20 Claims, 3 Drawing Sheets

DISTRIBUTED ACTIVE LEARNING IN NATURAL LANGUAGE PROCESSING FOR DETERMINING RESOURCE METRICS

SUMMARY

While some resource types may be characterized by the use of only quantitative metrics, a complete characterization of many types of resources may include natural language assessments from end-users, resource managers, and other stakeholders. However, these natural language assessments introduce biases, information asymmetry, and other sources of information inaccuracy. Moreover, such assessments are particularly susceptible to omissions of substantive information that would be useful to assign quantitative values based on natural language assessments. Furthermore, a conventional system may not consider changes in user response over time. Without an effective form of accounting for these biases and other sources of inaccuracy, these natural language assessments may cause mis-prioritization on resource capacity with respect to categories such as bandwidth, memory, and operation speed.

Embodiments of the present disclosure may include a system for improving machine-learning-based resource allocation by calibrating resource-related sentiments used to configure a dialogue generation model and updating a prior sentiment based on a response to a generated dialogue item, including a set of processors. Embodiments may also include a set of non-transitory, machine-readable media storing program instructions that, when executed by the set of processors, perform operations including retrieving a historical record associated with a user and a first natural language input provided by the user for a resource.

Embodiments may also include determining, with a first machine learning model, an intermediate sentiment score based on the first natural language input. Embodiments may also include modifying, with the first machine learning model, the intermediate sentiment score based on the historical record to produce a new sentiment score. Embodiments may also include generating, with a second machine learning model, a text prompt by configuring parameters of the second machine learning model based on the new sentiment score and a recognized token entity of the first natural language input.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

DETAILED DESCRIPTION

Figure 1:
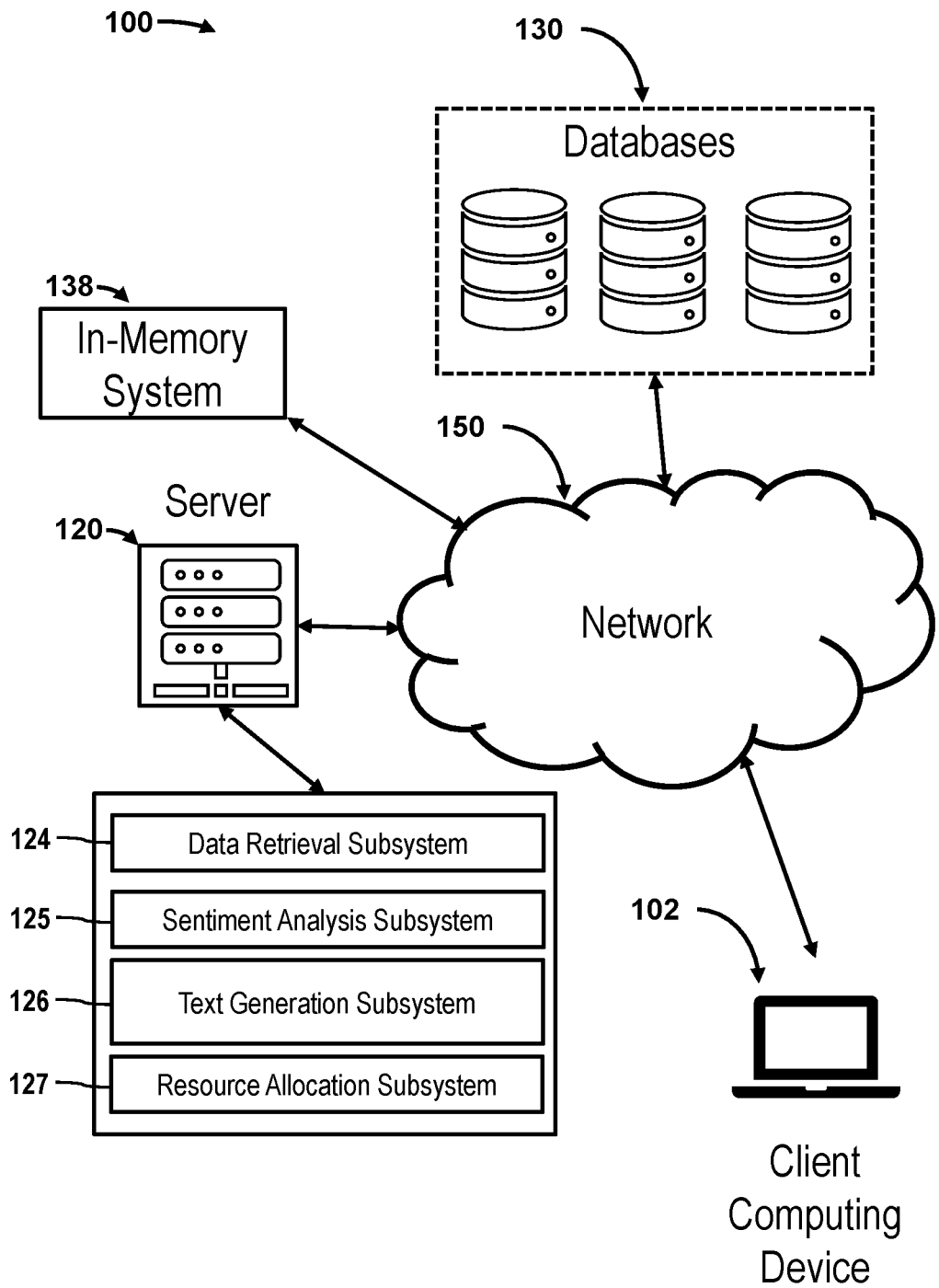
FIG. 1 shows an illustrative computer system for determining resource metrics using active learning operations based on the text inputs, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

A dialogue generation model or another natural language processing model may be useful for generating dialogue items such as a set of human-interpretable prompts that causes a user to provide more information on topics of interest about a resource. However, such user-provided information may often be affected by the various ways that biases and other uncontrolled factors may affect a user's responses to prompts or even the prompts themselves. Without an objective way to calibrate a user's natural language text inputs, a quantitative metric determined from the natural language text inputs may be too unreliable for resource allocation operations.

Some embodiments may address these technical problems by recalibrating metrics associated with a user's natural language response based on the user's previous responses, where weights for specific words or phrases may be raised or lowered based on the user's recorded tendencies. As a part of active learning operations, some embodiments may generate additional queries by using categories, sentiment scores, or other values associated with a token sequence. Some embodiments may use a machine learning system used to determine a sentiment score by determining other scores for additional queries and then using these other scores to increase or reduce the weights associated with certain tokens or token sequences. After updating the weights based on real-time or near real-time feedback provided by the user, some embodiments may then recompute the sentiment score for the resource. Some embodiments may then use the sentiment score to determine resource allocation operations, such as by sorting a resource sequence representing a resource prioritization scheme.

Some embodiments may further account for user bias by distributing dynamically generated queries to other users in order to improve training operations and receive evaluation scores based on the queries. Some embodiments may use these evaluation scores to update a machine learning model used to generate the queries and improve the efficiency of an active learning model used to sort resources based on their corresponding values for one or more categories. Moreover, some machine learning operations may point out specific words, sequences of text, or text patterns between different inputs that indicate why a particular output was selected to render the explainable decision to be explainable. Some embodiments may indicate similarities between different text sequences of different assessors in the context of their respective histories of assessments and further in the form of significant operations. By using machine learning to provide explainable scores, some embodiments may quantify and calibrate natural language assessments for different resources. Furthermore, explainable scoring provides decision-making entities with the ability to make additional refinements or modifications to long-term resource management.

FIG. 1 shows an illustrative computer system for determining resource metrics using active learning operations based on the text inputs, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include a set of non-transitory, computer readable media (e.g., "storage media") storing program instructions to perform one or more operations of subsystems 124-127. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an API of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with resources, resource identifiers, user identifiers, historical records associated with users, machine learning model parameters, machine learning model outputs, etc. For example, data objects of the set of databases 130 may include natural language assessments from users, quantitative metrics for resources, generated text, etc. In addition, the client computing device 102 or the server 120 may access data stored in an in-memory system 138, where the in-memory system may include an in-memory data store that stores data in a key-value data store such as Redis™. Some embodiments may store learning model parameters, learning model results, or other data in an in-memory data store to accelerate data retrieval or learning model operations.

In some embodiments, a data retrieval subsystem 124 may retrieve user inputs, historical records, or other information associated with a set of resources. The data retrieval subsystem 124 may receive instructions to retrieve various types of information used to determine resource allocation operations, results that will be used for other data retrieval operations, or other data described in this disclosure. For example, the data retrieval subsystem may receive instructions that cause the data retrieval subsystem 124 to retrieve a historical record associated with a user or a text prompt. The historical record may include a set of sentiment scores previously provided by the user, predicted sentiment scores to be provided by the user, data otherwise associated with the user, etc.

The data retrieval subsystem 124 may obtain other historical records, such as a historical record associated with a text prompt, where a text prompt may include any combination of words, numbers, or other tokens. Some embodiments may select a historical record based on a determination that a set of similarity criteria between a text prompt and a historical record or a text prompt of the historical record is satisfied. In some embodiments, a satisfaction of the set of similarity criteria by two semantic vectors may indicate that the pair of natural language text associated with two semantic vectors have similar meanings. For example, some embodiments may use a knowledge-based model or machine learning model to determine a set of categories based on a first text prompt displayed to a user. Some embodiments may then retrieve a historical record that includes a set of previously presented text prompts based on a determination that the first text prompt satisfies a set of similarity criteria with respect to the historical record. For example, a first text prompt may be "Elevates ORGI subject matter expertise through engagement," and a second text prompt may be "Proves expertise through blog posts, seminars, etc." Some embodiments may determine that the first and second text prompts satisfy a set of similarity criteria based on a determination that both first and second text prompts include a root category word "expert" and are thus associated with the category "expert." Based on a determination that the second category is part of a historical record, some embodiments may use scores of the historical record to normalize or otherwise calibrate a score associated with the first text prompt. Furthermore, a historical record may include information associated with both a text prompt and a user. For example, a historical record may be associated with both a user and a text prompt and include a set of sentiment scores previously provided by the user, predicted sentiment scores, a set of other text prompts associated with the text prompt, a set of other text inputs provided by other users presented with the text prompt or other text prompts, data otherwise associated with the user or the text prompt, etc.

Alternatively, or additionally, some embodiments may compute a set of semantic vectors to determine whether a pair of text prompts satisfies a set of similarity criteria. For example, some embodiments may determine that the first text prompt is associated with a first semantic vector equal to [0, 1, 5] and that the second text prompt is associated with a second semantic vector equal to [0.1, 1.1, 5.2]. Based on a determination that the first and second semantic vectors are within a range threshold of each other, some embodiments may determine that a set of similarity criteria is satisfied. Some embodiments may require multiple criteria to be satisfied before determining that a set of similarity criteria is satisfied. For example, some embodiments may determine that a set of similarity criteria between a first and second text prompt is satisfied only if both the first and second text prompt share a category and if their corresponding semantic vectors are within a threshold range of each other.

In some embodiments, a historical record may include scores that a set of users has assigned to a resource, machine learning model outputs associated with a set of text inputs provided by the set of users, text prompts associated with the text inputs, etc. For example, the data retrieval subsystem 124 may receive a user identifier and retrieve a historical record associated with the user based on the user identifier. The retrieved historical record may include multiple sentiment scores indicating sentiments associated with a resource, such as a computing resource, a program, etc. It should be understood that a resource may also include other entities that may be assessed, such as an organization or person. Furthermore, a historical record may include multiple text prompts or their associated text inputs, where a text input is associated with a text prompt if a user provides the text input in response to the text prompt. Furthermore, some embodiments may count a number of text prompts indicated to satisfy a set of similarity count thresholds with respect to each other.

In some embodiments, the data retrieval subsystem 124 may obtain a natural language input provided by a user, where the natural language input is provided by the user in response to the user receiving a text prompt. For example, a user may receive a text prompt asking the user "what are the advantages and disadvantages of the resource resource1?" The user may provide a natural language input by typing in a text input directly, saying a response that is then recorded, etc. Some embodiments may convert an audio recording into a text form using a set of dictation operations. Alternatively, or additionally, the data retrieval subsystem 124 may retrieve preprocessed data associated with a natural language input. For example, some embodiments may tokenize a natural language input into a sequence of tokens. Some embodiments may then use an encoding subsystem to generate a set of vectors representing the sequence of tokens, where the set of vectors may represent vectors in a latent space. For example, some embodiments may use an autoencoder to encode a token sequence to generate a corresponding sequence of vectors representing the token sequence or generate a vector representing the sequence as a whole.

In some embodiments, the data retrieval subsystem 124 may retrieve other data associated with a resource. For example, some embodiments may receive instructions associated with a first resource and, in response, retrieve a set of natural language inputs that represent assessments provided by a user for the first resource. Alternatively, or additionally, when provided instructions associated with a user, the data retrieval subsystem 124 may retrieve natural language assessments or data associated with the natural language assessments provided by the user, even if the assessments are not associated with the first resource. As described elsewhere in this disclosure, such information may be treated as part of a historical record indicating the user's past behavior.

In some embodiments, a sentiment analysis subsystem 125 may be used to assess a sentiment of a user's natural language inputs. For example, the sentiment analysis subsystem 125 may use one or more sentiment scoring operations to determine whether a user has a positive or negative sentiment about a resource. Alternatively, or additionally, the sentiment analysis subsystem 125 may perform operations to determine whether the user has a positive or negative sentiment about the resource with respect to a specific aspect, where the sentiment analysis subsystem 125 may determine that a user has a positive assessment of a resource with respect to a first aspect and a negative assessment of the resource with respect to a second aspect. For example, the sentiment analysis subsystem 125 may determine that a user's natural language input is associated with a positive sentiment for a resource with respect to its speed and a negative assessment for the resource with respect to its memory capacity.

The sentiment analysis subsystem 125 may include a knowledge-based model, a statistical model, a hybrid model, or another type of model used to determine a sentiment score and may include different sentiment scoring sub-models. For example, the sentiment analysis subsystem 125 may include a first sentiment scoring sub-model that includes a first neural network configured with a first set of machine learning model parameters and a second scoring sub-model that includes a second neural network configured with a second set of machine learning model parameters. Some embodiments may use the first machine learning model to provide a sentiment score based on a first text input of a user based on a determination that the user is associated with a specific role or other category and use the second machine learning model to provide a sentiment score based on a determination that the user is not associated with the specific role or category.

In some embodiments, the sentiment analysis subsystem 125 may account for a user's past behavior when assigning a sentiment score. Some embodiments may perform calibration operations based on a range (or another set of calibration values) provided by a user's past sentiment scores stored in a historical record associated with the user. For example, some embodiments may determine that a range of sentiment scores of the user is between 0.60 and 0.80. Some embodiments may then calibrate a user's response based on this range. For example, some embodiments may determine an intermediate sentiment score for a text input representing an assessment of a resource to be equal to 0.70 using a first machine learning model. As used in this disclosure, normalization of scores may be considered a form of score calibration, such that calibrating a score based on a historical record may include normalizing the score based on the historical record. Some embodiments may then determine a first sentiment score by subtracting the minimum value of the historical sentiment scores and normalizing the difference by the range 0.20, which would result in a first sentiment score equal to 0.50. While the above describes determining a range of sentiment scores based on a maximum and minimum value, some embodiments may determine the range of sentiment scores used to normalize an intermediate sentiment score in other ways. For example, some embodiments may determine a range of sentiment scores based on a measure of dispersion, such as a standard deviation, variance, etc.

In some embodiments, the sentiment analysis subsystem 125 may account for text inputs associated with text prompts similar to an initial text prompt when determining a sentiment score. After determining that user-provided text input is associated with an initial text prompt, some embodiments may perform calibration operations based on a range (or another set of calibration values) provided by past sentiment scores stored in a historical record associated with the text prompt. For example, some embodiments may determine that a first user provides a first text input in response to being presented with a first text prompt. Some embodiments may then retrieve a historical record associated with the first text prompt and determine a range of a historical set of sentiment scores of text inputs from the text prompt, where each sentiment score of the historical set of sentiment scores is associated with a text prompt similar to the first text prompt. Some embodiments may then determine an intermediate sentiment score based on the first text input and normalize an intermediate sentiment score based on the historical set of sentiment scores. Furthermore, it should be understood that some embodiments may normalize an intermediate sentiment score of a text input provided by a user in response to a first text prompt based on prior sentiment scores provided by the user and prior sentiment scores associated with text prompts different from but similar to the first text prompt.

In some embodiments, a text generation subsystem 126 may generate one or more text prompts that may then be presented to a user, which may cause the user to provide additional text inputs. In some embodiments, the text generation subsystem 126 may generate a text using a set of transformer neural networks to generate a sequence of tokens based on a set of sentiment scores and seed tokens or other types of seed values. The text generation subsystem 126 may provide a transformer neural network with a sentiment score representing the sentiment assigned to a text input and further with a seed token representing or derived from a token of the user's text input. For example, after a user provides a first natural language text input "I approve of resource's memory capacity" with respect to a resource, some embodiments may use the sentiment analysis subsystem 125 to determine that the user has a positive sentiment of the resource and further that the phrase "memory capacity" is an important feature. Some embodiments may then provide the token sequence "memory capacity" and a numeric value representing a positive sequence to a text generation subsystem.

In some embodiments, the text generation subsystem 126 may receive feedback scores representing assessments of the generated text prompts. The text generation subsystem 126 may perform active learning operations to update weights, biases, or other machine learning model parameters of one or more machine learning models used to generate text prompts. For example, some embodiments may provide a generated text prompt to a first user and a second user. The first user may be given instructions to provide an additional text input in response to the generated text prompt. The second user may be given instructions to provide a binary or categorical response indicating the usefulness of the generated text prompt. Some embodiments may then update the transformer model used to generate the text prompt based on the binary or categorical response. For example, some embodiments may determine that a response from the second user indicates that a generated new text prompt is relevant for determining additional information about a resource. In response, some embodiments may increase a model parameter such that increasing the model parameter increases the likelihood that an additional text prompt similar to the new text prompt is generated, where the additional text prompt may share a token sequence or have a similar semantic vector as that of the new text prompt.

In some embodiments, the resource allocation subsystem 127 may prioritize different resources for different types of services or operations based on the sentiment scores associated with the resources. For example, based on a determination that a resource is associated with a positive sentiment score, some embodiments may allocate the resource to a higher-priority service. Furthermore, some embodiments may dedicate additional sub-resources to the resource. For example, some embodiments may assign additional computing resources or other sub-resources to an application or another resource in response to a determination that the application has received a positive sentiment score.

Figure 2:
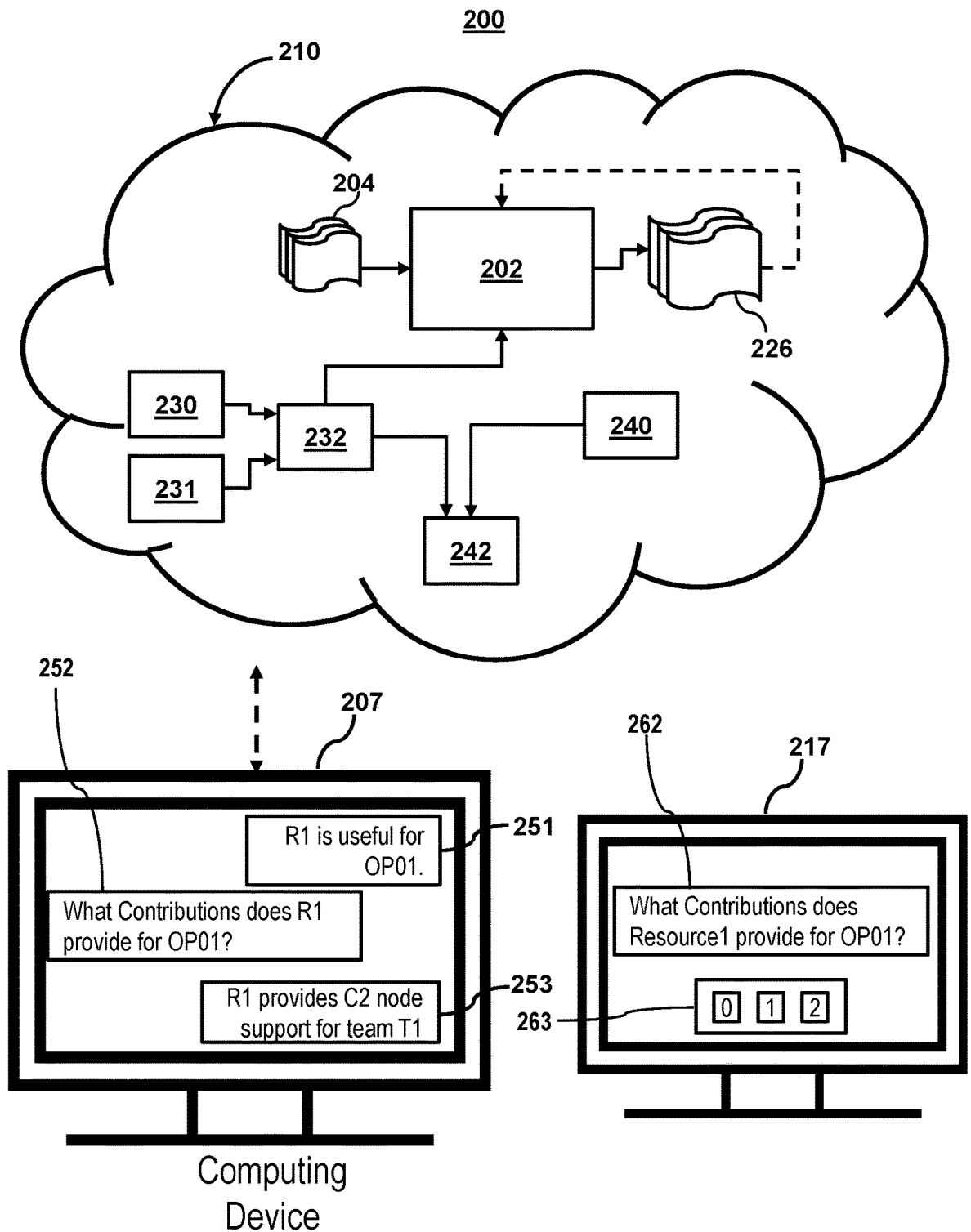
FIG. 2 shows an illustrative diagram of a machine learning model for performing active learning operations based on text inputs, in accordance with one or more embodiments.

FIG. 2 shows an illustrative diagram of a machine learning model for performing active learning operations based on text inputs, in accordance with one or more embodiments. A system 200 may include first computing device 207, where the first computing device 207 may be any computing device, including, but not limited to a smartphone, a laptop computer, etc. FIG. 2 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes, such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may synthesize new features to update datasets, dimensionally reduce the modified datasets, or train machine learning models based on the dimensionally reduced datasets using the cloud system 210.

Some embodiments may determine that multiple text prompts for a resource type may be related to the same set of categories and, in response, normalize or otherwise calibrate quantities associated with text responses with respect to each other. For example, a first user may provide a first score and a first text input associated with a first resource in response to being presented with a first text prompt. Some embodiments may retrieve the first historical record 230 of responses that includes a second score and a second text input regarding a second resource, where a second user had provided the text input in response to being presented with a second text prompt. Some embodiments may determine a first set of categories based on the first text prompt and a second set of categories based on the second text prompt. In response to a determination that the first text prompt and the second text prompt share a set of categories, some embodiments may calibrate a sentiment score or another quantitative value of the first text input based on a sentiment score of the second record or another set of values retrieved from the first historical record 230. The retrieved set of values may be associated with the user, one or more categories of the set of categories, the resource, a resource type of the resource, etc. Some embodiments may then use the retrieved records to calibrate or otherwise normalize a sentiment score assigned to a user response, where a non-normalized or normalized sentiment score may be stored in a historical record for later use.

Some embodiments may use a sentiment analyzer 232 to assign a sentiment score for a resource based on a text input provided by a user. As described elsewhere, the sentiment analyzer 232 may include various types of models, such as a knowledge-based model, a statistical model, etc. In some embodiments, the sentiment analyzer 232 may include a machine learning model to perform natural language processing operations such as deep parsing, determining complex grammatical relationships, etc. Some embodiments may display text inputs, text prompts, or other information in a set of user interface (UI) elements. For example, some embodiments may use the sentiment analyzer 232 to determine a sentiment based on a first text input shown in a UI element 251 and assign a numerical value indicating a sentiment of the user that provided the first text input based on the first text input. Furthermore, the sentiment analyzer may obtain a first historical record 230 associated with the user and a second historical record 231 associated with the first text prompt displayed in the UI element 251 (e.g., based on a determination that the first text prompt and the second historical record 231 satisfy a set of similarity criteria). The first computing device 207 may normalize sentiment scores determined by the sentiment analyzer 232 to determine a new sentiment score based on information in the first historical record 230 or the second historical record 231.

Some embodiments may provide a sentiment score output of the sentiment analyzer 232 to a machine learning model 202 to generate a set of text prompts 226, where the machine learning model 202 may have been trained on an input dataset 204. Some embodiments may train the machine learning model 202 by providing the machine learning model 202 with an input training dataset to generate output predictions. The machine learning model 202 may include a neural network model that includes an input neural network layer and a set of hidden neural network layers (e.g., where a signal path traverses from front layers to back layers). Each neural unit of the machine learning model 202 may be connected with many other neural units of the machine learning model Such connections can be enforcing or inhibitory in their effect on the activation state of connected neural units, where individual neural units may combine (e.g., add, multiple, etc.) the values of its inputs, and where each connection (or the neural unit itself) may have a threshold function such that a single input or combined must surpass the threshold before being propagated to other neural units. In some embodiments, the machine learning model 202 may update its model parameters (e.g., weights, biases, or other parameters) based on differences between output predictions and training references during a training operation or during another type of operation by using back-propagation techniques.

In some embodiments, the machine learning model 202 may update its model parameters based on user-provided evaluation scores indicating a relevancy of one or more text prompts of the set of text prompts 226 during an active learning operation. For example, based on a determination that a user indicated that a first text prompt is relevant (e.g., by receiving "2" from the set of interactive UI elements 263). In response, the cloud system 210 may update one or more values of the model parameters of the machine learning model 202 to increase the likelihood of generating the first text prompt or generating a text prompt having a similar structure or semantic vector as that of the first text prompt.

In some embodiments, the cloud system 210 may send a text prompt of the text prompts 226 to the first computing device 207, which may then be displayed in a UI element 252. A user of the first computing device 207 may then provide a second text input as displayed in a UI element 253 in response to being presented with the UI element 252. The cloud system 210 may then use the sentiment analyzer 232 to further determine a second sentiment score for the second text prompt displayed in the UI element 252 and normalize the second sentiment score based on the first historical record 230 or the second historical record 231. The cloud system 210 may then determine a resource allocation score based on the normalized sentiment score.

Furthermore, some embodiments may display a version of the same text prompt in a UI element 262, which is presented on a second computing device 217. A second user may interact with a set of interactive UI elements 263 displayed on the second computing device 217. Interaction with the set of interactive UI elements 263 may cause the second computing device 217 to send an evaluation score to the cloud system 210 and update one or more model parameters of the machine learning model 202 or another parameter of the cloud system 210.

Some embodiments may perform operations to predict a sentiment score based on a set of metrics associated with a resource. For example, a user may first be prompted to provide a set of quantitative values to characterize characteristics of a resource, where the values may be used as a set of metrics. Alternatively, or additionally, the set of metrics may include additional measurements obtained from sensors, oracles, or third-party entities. For example, the set of metrics may include a measurement of velocity, color, etc. Some embodiments may then provide the set metrics to a prediction model 240 that is used to determine a predicted sentiment score based on the set of metrics. Some embodiments may further update the prediction model 240 after obtaining, from a user, a set of metrics associated with a resource and a text input associated with the resource by using the prediction model 240 to determine a predicted sentiment score based on the set of metrics without using the natural language text input and then determining a new sentiment score by using the sentiment analyzer 232 to determine a sentiment based on the text input. Some embodiments may then determine a difference between the new sentiment score determined using the sentiment analyzer 232 and the predicted sentiment score provided by the prediction model 240. A prediction anomaly detector 242 may analyze the difference to detect a discrepancy based on a determination that the difference is greater than a threshold. In response to determining that the difference is greater than a threshold, some embodiments may generate a further text prompt based on a text input provided by a user to request clarification from the user or otherwise explain the discrepancy.

Figure 3:
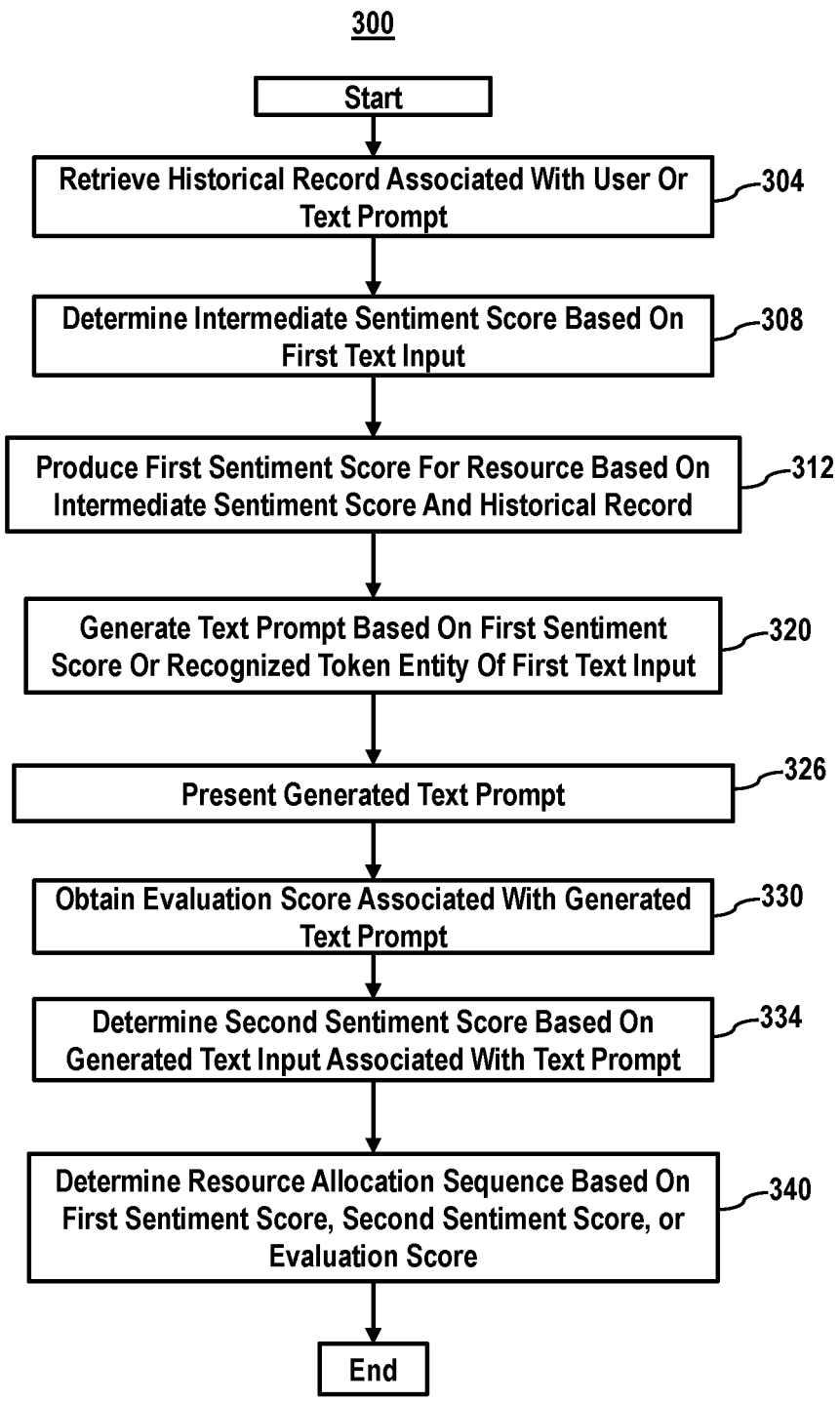
FIG. 3 shows a flowchart of an exemplary method for determining a set of resource allocation values, in accordance with one or more embodiments.

FIG. 3 shows a flowchart of an exemplary method for determining a set of resource allocation values, in accordance with one or more embodiments. Some embodiments may retrieve a historical record associated with a user or a text prompt, as indicated by block 304. In some embodiments, a historical record may include information such as a set of previous sentiment scores assigned to text inputs provided by a set of users or scores directly provided by the set of users. For example, a historical record may include a set of scores representing categorical responses to a first text prompt, "Owns Key Initiatives." The historical record may also include text input responses to other text prompts, where the other text prompts satisfy a set of similarity criteria with respect to the first text prompt. For example, another text prompt of the historical record may include a phrase such as "Controls Important Initiatives." The scores stored in a historical record may include computer-determined sentiment scores.

In some embodiments, the historical record may include a set of numbers representing sentiment scores for a first resource, where the sentiment scores may represent a general sentiment based on the text inputs provided by the user. For example, some embodiments may obtain a historical record that includes a first set of sentiment scores representing sentiments for all resources of a resource type "employee" based on previous text inputs provided by the user. Alternatively, or additionally, a sentiment score stored in the historical record or otherwise used in this disclosure may be associated with one or more specific categories. The categories may include standardized categories for a resource type of the resource, standard categories associated with the user, etc. For example, some embodiments may obtain a set of sentiment scores that include subsets of sentiment scores, where each respective subset of sentiment scores may correspond with a resource, and where each respective sentiment score of a subset of sentiment scores may correspond with a respective category. For example, a first sentiment score of a historical record may indicate a user's estimated sentiments regarding the efficiency of a resource, and a second sentiment score of the historical record may indicate the user's estimated sentiments regarding the capacity of the resource.

In some embodiments, the historical record may include other scores assigned by the user to a resource, such as scores associated with categories assigned to the resource. For example, some embodiments may receive ratings for the categories "reliability," "recognition," or "adaptability." Some embodiments may then include these ratings as scores in the historical record. As described elsewhere in this disclosure, some embodiments may use these scores to predict an anticipated sentiment score determined from a user's text input. Alternatively, or additionally, some embodiments may use these additional scores to detect one or more inconsistencies with a user's sentiment score. For example, if ratings have been great for each category of a set of categories associated with a resource but a sentiment score for the resource determined based on a user's text input is low, some embodiments may indicate a possible anomaly associated with the resource or a user's review of the resource.

Some embodiments may determine an intermediate sentiment score based on a first text input, as indicated by block 308. Some embodiments may use a sentiment analyzer of an existing natural language processing framework, such as the Natural Language ToolKit (NLTK) framework. For example, some embodiments may perform sentiment analysis on a text input by using a function based on the Valence Aware Dictionary for sEntiment Reasoning (VADER) model or another model capable of determining both sentiment polarity and sentiment intensity. Alternatively, or additionally, some embodiments may use a neural network model as a sentiment analyzer to determine a sentiment score.

In some embodiments, the first text input may be obtained via a web application being executed by a web browser or a native application being executed on a computing device. Alternatively, or additionally, some embodiments may obtain a text input from a set of messages being communicated via an electronic communication system. For example, some embodiments may obtain text inputs from a text messaging system, electronic mail, or another type of electronic communication system.

Some embodiments may use a custom function or model as a sentiment analyzer to determine a general sentiment based on a text input or a sentiment for a specific category. For example, some embodiments may obtain a set and keywords associated with the set. Some embodiments may then determine, for each respective category, text sections of the natural language text input associated with the respective category based on a determination that the text sections include or otherwise refer to the respective category or a keyword associated with a respective category. For example, some embodiments may obtain a set of categories that includes the category "performance," where the category may be associated with the keyword "performant." Some embodiments may then select a first text section that includes the word "performance," a second text section that includes the word "performant," and a third text section that includes a word or phrase that is determined to refer to the word "performance" or "performant." Some embodiments may then perform sentiment analysis based on the text sections to determine a sentiment score associated with the respective category or resource. For example, some embodiments may first determine a plurality of text sections associated with a category and then determine whether the plurality of text sections indicates a polarity or sentiment intensity, where either the polarity or sentiment intensity may be used as scores.

Some embodiments may use a semantic analyzer that uses a stored set of tokens ("stored token set") associated with a set of priority weights. The semantic analyzer may determine a sentiment score for a text input based on the stored token set or tokens related to the stored token set. In some embodiments, the priority weight for a respective token may indicate or otherwise be correlated with a frequency of token use or some other indication of the number of times that the respective token is used in the text input. Some embodiments may determine a subset of matched tokens, where each respective token of the subset of matched tokens is associated with a respective priority weight indicating a match with a token of the stored set of tokens. Some embodiments may then visually indicate a subset of matched tokens to indicate tokens that influenced a sentiment score. By visually indicating matched tokens, some embodiments may increase user trust in a sentiment scoring system by providing feedback on why a particular sentiment score was assigned.

Some embodiments may produce a first sentiment score for a resource based on the intermediate score and the historical record, as indicated by block 312. Some embodiments may determine a range of scores for a user based on the historical record associated with the user, where the range of scores may be used as a set of normalization values. For example, some embodiments may obtain a set of sentiment scores that were previously computed based on text inputs provided by the user. In some embodiments, each score of the set of sentiment scores used to determine a respective first (or new) sentiment score based on an intermediate score for a specified resource may be associated with a resource of the same resource type as the specified resource. For example, a user may be associated with a historical record that includes a set of sentiment scores where a first subset of sentiment scores are scores determined from text inputs associated with resources that are categorized as "client-side devices," and where a second subset of the sentiment scores is determined from text inputs associated with resources that are categorized as "server-side devices." Some embodiments may obtain instructions to determine a sentiment score for a resource. In response, some embodiments may determine a user identifier of the user and obtain a historical record associated with the user based on the user identifier. Some embodiments may then determine a subset of sentiment scores associated with the resource and determine a range based on the subset of sentiment scores, where the subset of sentiment scores are selected in part for being associated with a resource sharing the resource type of the specified resource.

Some embodiments may determine a range or another set of normalization values based on the historical record by determining a maximum and minimum value from a selected set of scores. In some embodiments, the selected set of scores may be limited by time, where only scores that were determined from text inputs provided in a specified duration are used for determining the range or other set of normalization values. Some embodiments may use a set of normalization values to rescale a sentiment score and account for possible biases or inconsistencies between different users. For example, some embodiments may use a range indicating a minimum value and a maximum value to normalize an intermediate score by subtracting the minimum value from the intermediate score and then dividing the difference by a difference between the maximum and minimum values.

Some embodiments may generate a probability distribution based on a history of scores by determining probability distribution function parameters based on values of the history of scores, where parameters of the probability distribution function may be used to generate the set of normalization values. Some embodiments may use a predetermined probability distribution function based on a history of scores. For example, some embodiments may use a normal distribution as a predetermined probability distribution function and determine the parameters of the probability distribution function by fitting the function to the set of scores of a historical record. Alternatively, some embodiments may attempt to fit a set of scores from a historical record to multiple types of distributions and use the distribution function determined to fit the set of scores best.

Some embodiments may use the generated probability distribution function to normalize or otherwise modify an intermediate sentiment score in order to determine a new sentiment score representing a normalized sentiment. For example, some embodiments may generate a normal distribution function based on a selected set of scores. Some embodiments may then normalize a determined sentiment score based on the normal distribution function, where the normalized value may indicate a percentage of sentiment scores of text inputs that are greater than the determined sentiment score.

As it should be understood, a set of data used to normalize a score may affect the value of the normalized score. Some embodiments may normalize a score using different subsets of data obtained from a historical record or multiple historical records associated with the user. For example, some embodiments may obtain, from a first user, a first text input representing an assessment of a first resource. In response, some embodiments may obtain a historical record of scores associated with the first user and select, from the historical record, a first subset of scores and a second subset of scores. In some embodiments, the first subset of scores may indicate sentiments of text outputs provided by a user for all resources associated with a resource type of the specified resource. The second subset of scores may indicate sentiments of text outputs provided by the user for the specified resource. Some embodiments may normalize a score based on the first and second subsets of scores, such as by normalizing a model-determined intermediate score based on a probability distribution determined from the first subset of scores to determine a first output score. Some embodiments may further normalize the first output score based on a probability distribution of the second subset of scores relative to the first subset of scores to determine a second output score.

Some embodiments may generate a text prompt based on the first sentiment score or a recognized token entity of the first text input, as indicated by block 320. Some embodiments may determine the set of input text to use based on one or more recognized token entities in a user's response, where a token entity may include a word, phrase, or another sequence of characters or spaces. For example, some embodiments may recognize that a user's text input includes the token entity "Project01" and, in response, select "Project01" as a recognized token entity to be used for text generation. Some embodiments may then use the recognized token entity "Project01" as input for a text generation model to generate an additional text prompt. As described elsewhere in this disclosure, this text prompt may cause a user to provide additional text inputs that may expand or clarify a user's sentiment regarding a resource.

Some embodiments may use a set of transformer neural network models as a set of text generation models to generate text. For example, some embodiments may use a generative pre-trained transformer (GPT) model, such as the GPT-language model, to generate a query based on a set of input text. For example, some embodiments may provide a recognized entity of user-provided text input as an input to a set of trained transformer neural networks to generate a text prompt. In some embodiments, the weights, biases, or other model parameters of the text prompt may be selected based on a sentiment score associated with the user-provided text input. In some embodiments, the sentiment score may be provided as an additional input to a text generation model. Furthermore, some embodiments may generate multiple text prompts based on a set of input text and then filter the multiple text prompts to select a text prompt for presentation or other use based on a sentiment score. For example, some embodiments may determine that a user-provided text input is associated with a positive sentiment score and recognize a token entity "PROJECT01" based on the presence of "PROJECT01" in a retrieved knowledge graph. Some embodiments may then generate an additional text prompt using a set of transformer neural networks by providing the token "PROJECT01" to the set of transformer neural networks to generate a set of outputs and filter the set of outputs based on the set of sentiment scores. While the above describes using a GPT-language model to generate text, some embodiments may use other types of transformer models to generate text, such as a switch transformer, or use other types of large language models to generate text.

Some embodiments may filter generated text prompts by, for each respective text prompt of the generated text prompts, determining a sentiment score for the respective text prompt. Some embodiments may then select a text prompt sentiment score that matches the sentiment score of user-provided text input and select a text prompt corresponding with the selected text prompt sentiment score. Alternatively, some embodiments may select a text prompt sentiment score that has a different sentiment score with respect to a user-provided text input, such as a text prompt sentiment score that has an opposite sentiment to the user-provided text input. Some embodiments may then select a text prompt corresponding with the selected text prompt sentiment score having the opposite sentiment for presentation to a user.

Some embodiments may use transfer learning operations to determine one or more model parameters, where the one or more model parameters may be retrieved based on a category associated with a user or a resource. For example, after receiving a text input from a user regarding an assessed resource, some embodiments may determine a set of response categories based on the text input. A response category may include a user type, a specified category obtained from a knowledge-based model, a resource type, etc. Some embodiments may retrieve a first set of parameters for a first layer of a set of neural network layers based on an association between the first set of parameters and a resource type of the assessed resource. Some embodiments may then retrieve a second set of parameters for a second layer of the set of neural network layers based on an association between a user category of the user and the second set of parameters.

While some embodiments may use a learning model to generate a text prompt, some embodiments may use a rule-based system to generate a text prompt based on a sentiment score or recognized token entity. Some embodiments may determine a recognized token entity using operations described in this disclosure and substitute a predetermined section of a text prompt template with the recognized token entity to generate a text prompt. For example, after determining that "subject01" is a recognized entity, some embodiments may substitute "[SUBJECT]" from the text prompt template "Please expand on [SUBJECT]" to generate the text prompt, "please expand on subject01." Some embodiments may further modify or select a parameter of a text prompt based on a sentiment score. For example, some embodiments may detect that a sentiment score for a text input describing a resource indicates a positive sentiment and display a text prompt that recites, "Please expand on subject01 and why the resource had a positive impact on subject01," where some embodiments may replace the word "positive" with "negative" based a determination that the sentiment score for a text input indicates a negative sentiment.

When generating a text prompt, some embodiments may determine that a required category is not mentioned in a text input and, in response, generate a text prompt based on the required category. For example, some embodiments may receive a set of categories that include "category1" and "category2," where each category included is associated with a respective set of entity identifiers. The category "category1" may be associated with the entity identifiers "category1" and "cat1," and the category "category2" may be associated with the entity identifiers "category2" and "c2." Some embodiments may determine a set of mentioned categories based on a text input that includes the string "cat1" and does not include the strings "category2" or "c2," where the set of mentioned categories does not include "category2." In response to a determination that the set of mentioned categories does not include "category2," some embodiments may then determine that the text input does not mention "category2." In response, some embodiments may generate a text prompt by using "category2" or a set of tokens associated with "category2" as a seed token input for a text generation operation.

Some embodiments may increase text prompt variability and information gathering opportunities by randomly selecting new seed tokens for discussion. For example, a computer system may retrieve a set of discussion categories and an associated set of category weights. Some embodiments may then use a pseudorandom or measurement-based random method to randomly select a category of the discussion categories, where the selection may be influenced by the associated category weights to have a greater probability of selecting a category associated with a greater category weight. Some embodiments may then generate a text prompt based on a token of an initial text input and the selected category or a token associated with the selected category, where some embodiments may have determined a first sentiment score based on the initial text input. Furthermore, as elsewhere in this disclosure, some embodiments may determine a second sentiment score based on a user-provided text input that is provided by a user in response to being presented with the generated text output. Some embodiments may then use a difference between the first and second sentiment scores to determine whether to update a weight. For example, based on a determination that a difference between the first and second sentiment scores is greater than a difference threshold, some embodiments may increase the category weight corresponding with the selected category.

Some embodiments may generate a text prompt based on a set of known entities representing permitted topics of discussion. For example, some embodiments may retrieve a set of known entities from a database. Some embodiments may then parse a user-provided text input into a set of token segments and determine candidate entities based on matches between tokens or token sequences of the set of token segments and the set of known entities. Some embodiments may then select a matching entity of the set of candidate entities as a recognized token entity for use as a seed token for text generation.

Some embodiments may present the generated text prompt, as indicated by block 326. Some embodiments may present a generated text prompt to a user that had previously provided a text input. For example, some embodiments may generate a text prompt based on a text input provided by a first user. Some embodiments may also provide the generated text prompt to another user, such as by providing the generated text prompt to a second user assigned to be a reviewing user. Furthermore, presenting a generated text prompt may include visually displaying the text prompt on a visual display or generating an audio recitation of the text prompt to be heard by a user.

Some embodiments may store previously generated text prompts or values derived from generated text prompts in a history of text prompts. For example, some embodiments may generate a set of semantic vectors based on a first generated text prompt and store the set of semantic vectors in a history of text prompts. Some embodiments may then determine a second set of semantic vectors based on a second generated text prompt and compare the first and second sets of semantic vectors. For example, a system may determine a first semantic vector using an autoencoder or another neural network model to determine a semantic vector based on the first generated text prompt. The system may then determine a second semantic vector using the autoencoder based on a second generated text prompt and determine a set of difference values between the first and second sets of semantic vectors to establish a range of values. In some embodiments, the first and second text prompts may be generated with one or more intervening text prompts generated between the first and second text prompts. Some embodiments may select the first and second semantic vectors from the history of text prompts based on a determination that the vectors are at a maximum range from each other or based on another set of criteria.

Some embodiments may then compare the range between the first and second semantic vectors and a range threshold to determine whether to accept or reject another generated text prompt. For example, some embodiments may generate a third text prompt and determine a third semantic vector based on the third text prompt. Some embodiments may then reject the third text prompt based on a determination that the third semantic vector is within the range determined based on the first and second semantic vectors and generate a new third text prompt. Alternatively, some embodiments may accept the third text prompt based on a determination that the third semantic vector is outside the range determined based on the first and second semantic vectors.

Some embodiments may obtain an evaluation score associated with the generated text prompt, as indicated by block 330. Some embodiments may receive the evaluation score from a user that was presented with a text prompt where a user may provide a binary, categorical, or quantitative value in association with the text prompt. For example, after displaying a text prompt to a user, some embodiments may receive a categorical value indicating the user's perceived relevance or usefulness of the text prompt for evaluating a resource. As described elsewhere in this disclosure, some embodiments may use the evaluation score when determining a score for resource allocation.

Some embodiments may use active learning operations to update inputs (e.g., seed tokens) or model parameters used when generating text. The active learning operations may include obtaining feedback regarding a generated text. For example, some embodiments may use different sub-models of a categorization model to determine a category from a category set used to generate a new text prompt, where a specified set of parameters may characterize a sub-model. A sub-model may include a specified model instance of a machine learning model, where different model instances may have the same architecture but be defined by different model parameters. Alternatively, or additionally, a sub-model may include machine learning models, knowledge-based models, statistical models, etc. such that a first sub-model may be of a different type than a second sub-model. For example, a first sub-model may include a neural network, and a second sub-model may include a knowledge-based model. Some embodiments may use the outputs of different sub-models to determine whether a category or other set of outputs satisfies a set of criteria that, upon satisfaction, causes a computer system to send an associated text prompt to another user for review. For example, some embodiments may provide a text input to a first sub-model to obtain a first output and provide the second text input to a second sub-model to obtain a second output. Some embodiments may then determine a divergence score based on the first and second outputs, as well as other outputs, where the outputs may include categories, tokens, vectors, etc. The divergence score may be determined based on a ratio or difference between different outputs or values derived from the different outputs. The divergence score may indicate a degree of disagreement between different sub-models and may be measured using various types of operations, such as by using a Kullback-Leibler approach to determine a divergence score. Some embodiments may generate different text prompts based on the different outputs.

Furthermore, some embodiments may determine which text prompts to send for further review by another user based on a comparison between a computed divergence score and a querying threshold. For example, some embodiments may generate a set of text prompts based on a set of sub-models of a text generation model and compute a divergence score based on the set of text prompts, one or more tokens of the text prompts, semantic vectors of the set of text prompts, or other values derived from the set of text prompts. Some embodiments may then determine that the computed divergence score exceeds a querying threshold, some embodiments may send a set of text prompts generated by the text generation model to a reviewing user for evaluation. Based on a set of evaluation scores from the reviewing user indicating a relevancy or usefulness of the generated text prompts, some embodiments may update a set of parameters of the text generation models or another model used to generate the set of text prompts. For example, a computer system may receive feedback that a first text prompt is more relevant than a second text prompt, where the first text prompt was generated based on an output category provided by a first sub-model, and where the second text prompt was generated based on an output category provided by a second sub-model. In response, the computer system may update a weight associated with the first sub-model or reduce a weight associated with the second sub-model such that outputs of the first sub-model are more likely to be used.

Some embodiments may determine a text prompt similarity score between different text prompts and compare the text prompt similarity score to a similarity threshold to determine whether to present the text prompt. For example, some embodiments may generate a text prompt based on values derived from a first text input that was provided by a user in response to being presented with an initial text prompt. Some embodiments may determine a similarity score between the generated text prompt and the initial text prompt based on a number of shared tokens, shared token sequences, or distance between associated semantic vectors, where a greater similarity score may indicate a greater amount of similarity. Based on a determination that the similarity score is greater than a similarity threshold, some embodiments may present the generated text prompt to the user.

Some embodiments may determine a second sentiment score based on a text input associated with the generated text prompt, as indicated by block 334. Some embodiments may use similar operations as those described for block 308 and block 312 to determine a second (or further) sentiment score based on a text input received from the user. For example, a computer system may determine a first sentiment score based on a first text input provided by a user by providing the first text input to a selected sentiment analyzer to determine an intermediate score and then calibrating the intermediate score based on a historical record of scores computed for the user. The computer system may then generate a text prompt using operations similar to those described for block 320 and present the generated text prompt to the user. Some embodiments may then provide the generated text prompt to the selected sentiment analyzer to determine a further sentiment score and calibrate the further sentiment score based on the historical record of scores.

Some embodiments may generate multiple text prompts by performing a sequence of operations that include multiple cycles of generating a new text prompt based on a user-provided text input and obtaining a new text input from the user after presenting the user with the new text prompt. For example, some embodiments may obtain a first text input, generate a first text prompt based one or more tokens of the first text input, present the first text prompt to the user, obtain a second text input from the user in response to the first text prompt, generate a second text prompt based on one or more tokens of the second text input, and receive a third text input from the user in response to the second text prompt. Some embodiments may determine an additional sentiment score for each of these text inputs associated with a resource and determine a resource allocation score based on the corresponding sentiment scores. By determining additional sentiment scores, some embodiments may further refine or otherwise obtain more accurate information about a resource based on natural language text provided by a user.

Some embodiments may discard changes made by a user-provided text input provided in response to a generated text prompt in response to a determination that the change to a sentiment was negligible. For example, some embodiments may determine that a first user-provided text input is associated with a specified category and generate a text prompt based on the category and a sentiment score associated with the first user-provided text input. After receiving a second text input associated with the generated text prompt, some embodiments may generate a second text prompt based on the second text input. Some embodiments may then determine whether a difference between the sentiment of the first text input and the third text input satisfies a difference threshold to determine whether or not to use a sentiment score of the third text input or whether to continue a set of text generation operations. As described elsewhere in this disclosure, some embodiments may update the first sentiment score to a new value based on the third sentiment score. In some embodiments, in response to a determination that the difference between the first and third text inputs is less than a difference threshold, some embodiments may revert the first sentiment score to its value before being updated by the third sentiment score or before being stored in a history of scores. By reverting the score to a previous value, some embodiments may reduce the confusion caused by storing an unnecessary score in a history of scores.

Some embodiments may determine a resource allocation sequence based on the first sentiment score, the second sentiment score, or an evaluation score, as indicated by block 340. Some embodiments may determine a plurality of sentiment scores for a plurality of text inputs indicating resource-related sentiments provided by a user. A system may determine a first sentiment score based on a first text input associated with a resource and determine a further sentiment score based on a second text input associated with the resource, where the second text input may be provided by the user in response to a text prompt generated based on the first sentiment score and a token of the first sentiment score. The system may then use one of various types of heuristics to determine a resource allocation score for the resource to determine a resource allocation order for the resource. For example, some embodiments may set the resource allocation as an average of the first and second resource allocation scores or a weighted sum of the first and second resource allocation scores.

Some embodiments may update a sentiment score or update a resource allocation score based on an evaluation score associated with a text prompt. As described elsewhere in this disclosure, some embodiments may obtain an evaluation score associated with a text prompt and update a text input provided by a user in response to being presented with the text prompt, where the evaluation score may be a binary value, a categorical value, or a quantitative value. Some embodiments may then modify a resource allocation score associated with the text input based on the evaluation score. For example, a computer system may determine a first sentiment score for a first user-provided text input about a resource to be 0.9 and a further sentiment score for a second user-provided text input about the resource to be 0.3, where the further sentiment score may be associated with a generated text prompt by being provided by a user in response to receiving the text prompt.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-127 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 124-127 may provide more or less functionality than is described. For example, one or more of subsystems 124-127 may be eliminated, and some or all of its functionality may be provided by other ones of subsystems 124-127. As another example, additional subsystems may be programmed to perform some or all of the functionality attributed herein to one of subsystems 124-127 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

Enumerated Embodiments

The present techniques will be better understood with reference to the following enumerated embodiments:

1. A method comprising: retrieving a historical record associated with a user; determining, with a first machine learning model, an intermediate sentiment score based on a first text input; modifying the intermediate sentiment score based on the historical record to produce a new (or first) sentiment score for a resource; generating, with a second machine learning model, a text prompt based on the new (or first) sentiment score and a recognized token entity of the first text input; determining a further (or second) sentiment score based on a second text input associated with the text prompt; and determining a resource allocation sequence comprising the resource based on the further (or second) sentiment score.

2. A method comprising: retrieving a historical record associated with a user and a first natural language input provided by the user for a resource; determining, with a first machine learning model, an intermediate sentiment score based on the first natural language input; modifying, with the first machine learning model, the intermediate sentiment score based on the historical record to produce a new (or first) sentiment score; generating, with a second machine learning model, a text prompt by configuring parameters of the second machine learning model based on the new (or first) sentiment score and a recognized token entity of the first natural language input; obtaining, from the user, a second natural language input associated with the resource, wherein the second natural language input is associated with the text prompt; determining, with the first machine learning model, a further (or second) sentiment score based on the second natural language input provided by the user in response to the text prompt; and determining a resource allocation sequence comprising the resource based on the new sentiment score and the further (or second) sentiment score.

3. A method comprising: retrieving a historical record associated with a user; determining, with a first machine learning model, an intermediate sentiment score based on a first text input; and modifying the intermediate sentiment score based on the historical record to produce a new (or first) sentiment score for a resource; generating, with a second machine learning model, a text prompt based on the new (or first) sentiment score and a recognized token entity of the first text input; determining a further (or second) sentiment score determined based on a second text input associated with the text prompt; and determining a resource allocation sequence comprising the resource based on the further (or second) sentiment score.

4. The method of any of embodiments 1 to 3, wherein the resource is a first resource associated with a first set of metrics, further comprising: retrieving a second set of metrics associated with a second resource; providing the second set of metrics and the historical record to a third machine learning model to obtain a predicted sentiment score, wherein determining the resource allocation sequence comprises determining an order of resources of the resource allocation sequence based on the predicted sentiment score.

5. The method of embodiment 4, wherein the predicted sentiment score is a first predicted sentiment score, further comprising: providing the first set of metrics and the historical record to the third machine learning model to obtain a second predicted sentiment score; and updating parameters of the third machine learning model based on a difference between the second sentiment score and the second predicted sentiment score.

6. The method of any of embodiments 1 to 5, wherein the text prompt is a second text prompt, further comprising: presenting a first text prompt to the user, wherein the first text prompt may be provided to the user, and wherein the first text prompt is associated with the first text input; determining whether the first text prompt and a second historical record satisfy a set of similarity criteria, wherein the second historical record comprises a plurality of text inputs provided by other users; and retrieving a second historical record based on a determination that the first text prompt and the second historical record satisfy the set of similarity criteria, wherein modifying the intermediate sentiment comprises modifying the intermediate sentiment based on the second historical record.

7. The method of any of embodiments 1 to 6, further comprising: retrieving a set of known entities; parsing the first text input into a set of token segments; determining a set of candidate entities based on the set of token segments; and detecting a matching entity between the set of candidate entities and the set of known entities; and selecting the matching entity as the recognized token entity.

8. The method of any of embodiments 1 to 7, wherein generating the text prompt comprises: retrieving a first set of neural network layers associated with the recognized token entity; retrieving a second set of neural network layers associated with the new sentiment score; and configuring the second machine learning model based on the first set of neural network layers and the second set of neural network layers.

9. The method of any of embodiments 1 to 8, wherein the user is a first user, further comprising: determining a category based on the first text input; wherein generating the text prompt comprises generating, with the second machine learning model, a plurality of text prompts based on the category and the new sentiment score; retrieving, from a second user, a plurality of evaluation scores associated with the plurality of text prompts; sorting seed tokens used to generate the plurality of text prompts based on the plurality of evaluation scores; and training the second machine learning model based on the plurality of text prompts.

10. The method of any of embodiments 1 to 9, wherein generating the text prompt comprises: selecting a seed token based on the recognized token entity; and generating the text prompt by providing the seed token to the second machine learning model as an input.

11. The method of any of embodiments 1 to 10, wherein the text prompt is a first text prompt, further comprising: generating a second text prompt based on the new sentiment score; determining a text prompt similarity score between the first text prompt and the second text prompt based on a token sequence of the second text prompt and a token sequence of the second text prompt; and in response to a determination that the text prompt similarity score satisfies a similarity threshold, presenting the second text prompt to the user.

12. The method of any of embodiments 1 to 11, further comprising: obtaining a set of messages sent through an electronic communication system; and updating the first text input to comprise the set of messages.

13. The method of any of embodiments 1 to 12, wherein the user is a first user, the method further comprising: storing the text prompt in a database of text prompts; obtaining a third text input from a second user, wherein the third text input is associated with the resource; determining an additional sentiment score based on the third text input; determining whether the additional sentiment score is within a range threshold of the new sentiment score; and presenting the text prompt to the second user.

14. The method of any of embodiments 1 to 13, wherein the user is a first user, the method further comprising: determining a divergence score by providing the first text input to a plurality of sub-models, wherein: each respective sub-model of the plurality of sub-models outputs a respective category of a category set; a first sub-model of the plurality of sub-models output a first category based on the first text input; and generating the text prompt comprises generating the text prompt based on the first sub-model; determining whether the divergence score satisfies a querying threshold; in response to a determination that the divergence score satisfies the querying threshold, presenting the text prompt to a device of a second user.

15. The method of any of embodiments 1 to 14, the method further comprising: providing set of metrics associated with the resource to a third machine learning model to obtain a predicted sentiment score; and determining a difference between the predicted sentiment score and the new sentiment score, wherein generating the text prompt comprises generating the text prompt in response to a determination that the difference satisfies a threshold.

16. The method of any of embodiments 1 to 15, the method further comprising: retrieving a set of categories; retrieving a dataset, wherein each category of the set of categories is associated with one or more identifiers of a set of entity identifiers of the dataset; parsing the first text input into a set of token segments; determining a set of candidate entities based on the set of token segments; determining a set of mentioned categories based on matches between on the set of candidate entities and the set of entity identifiers of the dataset; determining a category of the set of categories that is not a category of the set of mentioned categories, wherein generating the text prompt comprises generating the text prompt based on the category.

17. The method of any of embodiments 1 to 16, the method further comprising: retrieving a stored token set associated with a set of priority weights, wherein each respective priority weight of the set of priority weights indicates a frequency of token use for a token or token sequence of the stored token set; and determining a subset of matched tokens based on matches of token or matches of token sequences between the first text input and the stored token set, wherein determining the intermediate sentiment score comprises determining the intermediate sentiment score based on the subset of matched tokens.

18. The method of any of embodiments 1 to 17, the method further comprising: randomly selecting a category of a plurality of categories based on category weights associated with the plurality of categories, wherein the category is associated with an associated category weight, and wherein generating the text prompt comprises generating the text prompt based on the new sentiment score; determining whether a difference between the new sentiment score and the further sentiment score is satisfies a difference threshold; and in response to a determination that the difference between the new sentiment score and the further sentiment score is satisfies the difference threshold, increasing a value of the associated category weight.

19. The method of any of embodiments 1 to 18, wherein the first text input is associated with a response category, the method further comprising: retrieving a set of neural network layers associated with the response category; configuring the second machine learning model based on the set of neural network layers.

20. The method of any of embodiments 1 to 19, wherein the text prompt is a first text prompt, the method further comprising: determining a category based on the first text input; generating a second text prompt based on the category and the new sentiment score; obtaining, from the user, a third text input associated with the second text prompt; updating the new sentiment score from a first value to a second value based on a additional sentiment score determined based on the third text input; determining whether a difference between the new sentiment score and the additional sentiment score is less than a difference threshold; and in response to a determination that the difference between the new sentiment score and the additional sentiment score is less than the difference threshold, reverting the new sentiment score to the first value.

21. The method of embodiment 20, the method further comprising: generating a first set of semantic vectors based on the first text prompt; generating a second set of semantic vectors based on the second text prompt; and determining a range threshold based on a set of difference values between the first set of semantic vectors and the second set of semantic vectors; generating a third set of semantic vectors based on a third text prompt; determining whether the third set of semantic vectors satisfies the range threshold; and in response to a determination that the third set of semantic vectors satisfies the range threshold, present the third text prompt to the user.

22. One or more tangible, non-transitory, machine-readable media storing instructions that, when executed by a set of processors, cause the set of processors to effectuate operations comprising those of any of embodiments 1-21.

23. A system comprising: a set of processors and memory storing computer program instructions that, when executed by the set of processors, cause the set of processors to effectuate operations comprising those of any of embodiments 1-21.

What is claimed is:

1. A system for improving machine-learning-based resource allocation by calibrating resource-related sentiments used to configure a dialogue generation model and updating a prior sentiment based on a response to a generated dialogue item, comprising:
one or more processors; and
one or more non-transitory, machine-readable media storing program instructions that, when executed by the one or more of processors, performs operations comprising:
determining, with a first machine learning model, an intermediate sentiment score based on a first natural language input and a historical record associated with a user by (1) providing the first natural language input to the first machine learning model as an input to obtain the intermediate sentiment score and (2) modifying the intermediate sentiment score by calibrating the intermediate sentiment score based on a score or a score range indicated by the historical record to produce a new sentiment score, wherein the first natural language input identifies a resource and is provided by the user,
generating, with a second machine learning model, a text prompt by configuring parameters of the second machine learning model based on the new sentiment score and a recognized token entity of the first natural language input;
obtaining, from the user, a second natural language input associated with the resource, wherein the second natural language input is associated with the text prompt;
determining a resource allocation sequence comprising the resource by (i) providing the second natural language input to, with the first machine learning model to determine a further sentiment score and (ii) updating the new sentiment score based on the further sentiment score, and
allocating the resource to an application based on the resource allocation sequence.

2. A computer-implemented method for improving machine-learning-based resource allocation comprising:
retrieving, with one or more processors, a historical record associated with a user;
determining, with the one or more processors and with a first machine learning model, an intermediate sentiment score based on a first text input and the historical record associated with the user by (1) providing the first text input to the first machine learning model as an input to obtain the intermediate sentiment score and (2) modifying the intermediate sentiment score by calibrating the intermediate sentiment score based on a score or a score range indicated by the historical record to produce a new sentiment score, wherein the first text input identifies a resource and is provided by the user;
generating, with the one or more processors and with a second machine learning model, a text prompt based on the new sentiment score and a recognized token entity of the first text input;
determining, with the one or more processors, a resource allocation sequence comprising the resource by (i) providing a second text input to the first machine learning model to determine a further sentiment score and (ii) updating the new sentiment score based on the further sentiment score; and
allocating the resource to an application based on the resource allocation sequence.

3. The computer-implemented method of claim 2, wherein the resource is a first resource associated with a first set of metrics, further comprising:
retrieving a second set of metrics associated with a second resource; and
providing the second set of metrics and the historical record to a third machine learning model to obtain a predicted sentiment score, wherein determining the resource allocation sequence comprises determining an order of resources of the resource allocation sequence based on the predicted sentiment score.

4. The computer-implemented method of claim 2, wherein the text prompt is a second text prompt, further comprising:
modifying the intermediate sentiment score based on the historical record to produce a new sentiment score for a resource;
presenting a first text prompt to the user, wherein the first text prompt may be provided to the user, and wherein the first text prompt is associated with the first text input;
determining whether the first text prompt and a second historical record satisfy a set of similarity criteria, wherein the second historical record comprises a plurality of text inputs provided by other users; and
retrieving the second historical record based on a determination that the first text prompt and the second historical record satisfy the set of similarity criteria, wherein modifying the intermediate sentiment score comprises modifying the intermediate sentiment score based on the second historical record.

5. The computer-implemented method of claim 2, further comprising:
retrieving a set of known entities;
parsing the first text input into a set of token segments;
determining a set of candidate entities based on the set of token segments;
detecting a matching entity between the set of candidate entities and the set of known entities; and
selecting the matching entity as the recognized token entity.

6. The computer-implemented method of claim 2, wherein generating the text prompt comprises:
retrieving a first set of neural network layers associated with the recognized token entity;
retrieving a second set of neural network layers associated with the new sentiment score; and
configuring the second machine learning model based on the first set of neural network layers and the second set of neural network layers.

7. The computer-implemented method of claim 2, wherein the user is a first user, further comprising:

determining a category based on the first text input;
wherein generating the text prompt comprises generating, with the second machine learning model, a plurality of text prompts based on the category and the new sentiment score;
retrieving, from a second user, a plurality of evaluation scores associated with the plurality of text prompts;
sorting seed tokens used to generate the plurality of text prompts based on the plurality of evaluation scores; and
training the second machine learning model based on the plurality of text prompts.

8. The computer-implemented method of claim 2, wherein generating the text prompt comprises:
selecting a seed token based on the recognized token entity; and
generating the text prompt by providing the seed token to the second machine learning model as an input.

9. The computer-implemented method of claim 2, wherein the text prompt is a first text prompt, further comprising:
generating a second text prompt based on the new sentiment score;
determining a text prompt similarity score between the first text prompt and the second text prompt based on a token sequence of the first text prompt and a token sequence of the second text prompt; and
in response to a determination that the text prompt similarity score satisfies a similarity threshold, presenting the second text prompt to the user.

10. The computer-implemented method of claim 2, further comprising:
obtaining a set of messages sent through an electronic communication system; and
updating the first text input to comprise the set of messages.

11. A set of non-transitory, machine-readable media for improving machine-learning-based resource allocation storing program instructions that, when executed by a set of processors, performs operations comprising:
retrieving a historical record associated with a user;
determining, with a first machine learning model, an intermediate sentiment score based on a first text input and the historical record associated with the user by (1) providing the first text input to the first machine learning model as an input to obtain the intermediate sentiment score and (2) modifying the intermediate sentiment score by calibrating the intermediate sentiment score based on a score or a score range indicated by the historical record to produce a new sentiment score for a resource, wherein the first text input identifies a resource and is provided by the user;
generating, with a second machine learning model, a text prompt based on the new sentiment score and a recognized token entity of the first text input;
determining a resource allocation sequence comprising the resource by (i) providing a second text input to the first machine learning model to determine a further sentiment score and (ii) updating the new sentiment score based on the further sentiment score; and
allocating the resource to an application based on the resource allocation sequence.

12. The set of non-transitory, machine-readable media of claim 11, wherein the user is a first user, the operations further comprising:
storing the text prompt in a database of text prompts;
obtaining a third text input from a second user, wherein the third text input is associated with the resource;
determining an additional sentiment score based on the third text input;
determining whether the additional sentiment score is within a range threshold of the new sentiment score; and
presenting the text prompt to the second user.

13. The set of non-transitory, machine-readable media of claim 11, wherein the user is a first user, the operations further comprising:
determining a divergence score indicating sub-model output differences by providing the first text input to a plurality of sub-models, wherein:
each respective sub-model of the plurality of sub-models outputs a respective category of a category set;
a first sub-model of the plurality of sub-models outputs a first category based on the first text input; and
generating the text prompt comprises generating the text prompt based on the first sub-model;
determining whether the divergence score satisfies a querying threshold; and
in response to a determination that the divergence score satisfies the querying threshold, presenting the text prompt to a device of a second user.

14. The set of non-transitory, machine-readable media of claim 11, the operations further comprising:
providing a set of metrics associated with the resource to a third machine learning model to obtain a predicted sentiment score; and
determining a difference between the predicted sentiment score and the new sentiment score, wherein generating the text prompt comprises generating the text prompt in response to a determination that the difference satisfies a threshold.

15. The set of non-transitory, machine-readable media of claim 11, the operations further comprising:
retrieving a set of categories;
retrieving a dataset, wherein each category of the set of categories is associated with one or more identifiers of a set of entity identifiers of the dataset;
parsing the first text input into a set of token segments;
determining a set of candidate entities based on the set of token segments;
determining a set of mentioned categories based on matches between the set of candidate entities and the set of entity identifiers of the dataset; and
determining a category of the set of categories that is not a category of the set of mentioned categories, wherein generating the text prompt comprises generating the text prompt based on the category.

16. The set of non-transitory, machine-readable media of claim 11, the operations further comprising:
retrieving a stored token set associated with a set of priority weights, wherein each respective priority weight of the set of priority weights indicates a frequency of token use for a token or token sequence of the stored token set; and
determining a subset of matched tokens based on a match of tokens or a match of token sequences between the first text input and the stored token set, wherein determining the intermediate sentiment score comprises determining the intermediate sentiment score based on the subset of matched tokens.

17. The set of non-transitory, machine-readable media of claim 11, the operations further comprising:
randomly selecting a category of a plurality of categories based on category weights associated with the plurality of categories, wherein the category is associated with an associated category weight, and wherein generating the text prompt comprises generating the text prompt based on the new sentiment score;

determining whether a difference between the new sentiment score and the further sentiment score satisfies a difference threshold; and in response to a determination that the difference between the new sentiment score and the further sentiment score satisfies the difference threshold, increasing a value of the associated category weight.

18. The set of non-transitory, machine-readable media of claim 11, wherein the first text input is associated with a response category, the operations further comprising:

retrieving a set of neural network layers associated with the response category; and configuring the second machine learning model based on the set of neural network layers.

19. The set of non-transitory, machine-readable media of claim 11, wherein the text prompt is a first text prompt, the operations further comprising:

determining a category based on the first text input;

generating a second text prompt based on the category and the new sentiment score;

obtaining, from the user, a third text input associated with the second text prompt;

updating the new sentiment score from a first value to a second value based on an additional sentiment score determined based on the third text input;

determining whether a difference between the new sentiment score and the additional sentiment score is less than a difference threshold; and in response to a determination that the difference between the new sentiment score and the additional sentiment score is less than the difference threshold, reverting the new sentiment score to the first value.

20. The set of non-transitory, machine-readable media of claim 19, the operations further comprising:

generating a first set of semantic vectors based on the first text prompt;

generating a second set of semantic vectors based on the second text prompt;

determining a range threshold based on a set of difference values between the first set of semantic vectors and the second set of semantic vectors;

generating a third set of semantic vectors based on a third text prompt;

determining whether the third set of semantic vectors satisfies the range threshold; and in response to a determination that the third set of semantic vectors satisfies the range threshold, presenting the third text prompt to the user.

\* \* \* \* \*